United States Patent
Seeger (10) Patent No.: US 12,467,943 B2
(45) Date of Patent: Nov. 11, 2025

(54) CONFIGURATION METHOD OF CONFIGURING A MEASUREMENT INSTRUMENT

(71) Applicant: Rohde & Schwarz GmbH & Co. KG, Munich (DE)

(72) Inventor: Julius Seeger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 278 days.

(21) Appl. No.: 18/320,441

(22) Filed: May 19, 2023

(65) Prior Publication Data
US 2024/0385213 A1    Nov. 21, 2024

(51) Int. Cl.
| G01R 1/04 | (2006.01) |
| G01R 1/30 | (2006.01) |
| G01R 13/02 | (2006.01) |
| G01R 35/00 | (2006.01) |

(52) U.S. Cl.
CPC ............. *G01R 1/0416* (2013.01); *G01R 1/30* (2013.01); *G01R 13/02* (2013.01); *G01R 35/005* (2013.01)

(58) Field of Classification Search
CPC ........ G01R 1/0416; G01R 1/30; G01R 13/02; G01R 35/005
See application file for complete search history.

(56) References Cited

U.S. PATENT DOCUMENTS

| 6,965,800 | B2 | 11/2005 | Schmit et al. |
| 7,536,600 | B2 | 5/2009 | Fay et al. |
| 2015/0082315 | A1* | 3/2015 | Overbeck ............. G06F 9/4881 718/102 |
| 2018/0349508 | A1* | 12/2018 | Bequet .................. G06F 18/217 |
| 2024/0036143 | A1* | 2/2024 | B ........................ G01R 31/2601 |

* cited by examiner

*Primary Examiner* — Akm Zakaria
(74) *Attorney, Agent, or Firm* — CHRISTENSEN O'CONNOR JOHNSON KINDNESS PLLC (57) ABSTRACT

A configuration method of configuring a measurement instrument is described. The measurement instrument comprises at least one measurement port being connectable to at least one device under test. The measurement instrument further comprises a control circuit and a measurement circuit. The control circuit is connected to the measurement circuit. The measurement circuit is connected to the at least one measurement port. The configuration method comprises the steps of: comparing a loaded test routine with configuration data stored in the measurement instrument, determining whether the test routine is performable by the measurement instrument based on the comparison of the test routine with the configuration data; and adapting the loaded test routine based on the configuration data.

19 Claims, 2 Drawing Sheets

CONFIGURATION METHOD OF CONFIGURING A MEASUREMENT INSTRUMENT

FIELD OF THE DISCLOSURE

Embodiments of the present disclosure generally relate to a configuration method of configuring a measurement instrument. Embodiments of the present disclosure further relate to a measurement instrument.

BACKGROUND

Many different types of electronic devices under test need to be connected to a measurement instrument by a wired connection in order to perform tests on the device under test.

Different devices under test may have different numbers of ports that need to be connected to the measurement instrument. Likewise, different measurement instruments may have different numbers of measurement ports that are connectable to the device under test.

Moreover, each measurement instrument may have a large number of possible configurations regarding the hardware and software of the measurement instruments.

Usually, test routines are devised to be suitable for testing a particular type of device under test with a particular type of measurement instrument.

Accordingly, if a user wants to test a device under test with another measurement instrument, the user has to manually adapt the settings of measurement instrument, as the settings of the previously used measurement instrument cannot be reused.

Thus, changing from one measurement instrument to another for testing a particular device under test requires a considerable amount of expertise and time.

Thus, there is a need for a configuration method of configuring a measurement instrument as well as for a measurement instrument that allow for an easier transfer of test routines between measurement instruments.

SUMMARY

Embodiments of the present disclosure provide a configuration method of configuring a measurement instrument. The measurement instrument comprises at least one measurement port being connectable to at least one device under test. The measurement instrument further comprises a control circuit and a measurement circuit. The control circuit is connected to the measurement circuit. The measurement circuit is connected to the at least one measurement port. In some embodiments, the configuration method comprises the steps of:

loading, by the control circuit, a test routine comprising at least one test sequence to be performed by the measurement circuit;

comparing, by the control circuit, the test routine with configuration data stored in the control circuit, wherein the configuration data comprises information at least on a hardware configuration of the measurement instrument;

determining, by the control circuit, whether the test routine is performable by the measurement instrument based on the comparison of the test routine with the configuration data; and adapting, by the control circuit, the loaded test routine based on the configuration data, thereby obtaining an adapted test routine to be performed by the measurement circuit.

Therein and in the following, the term "loading a test routine" is understood to denote that the test routine may be loaded from a (non-volatile) memory of the measurement instrument, and/or that the test routine may be received from another measurement instrument or from an external computer device.

Further, the term "determining whether the test routine is performable" is understood to denote that requirements of the test routine are compared with the (hardware) configuration of the measurement instrument. In some embodiments, minimum requirements for performing the test routine may be compared to the (hardware) configuration of the measurement instrument.

For example, the step of determining whether the test routine is performable by the measurement instrument may comprise determining whether the measurement instrument comprises enough measurement ports to perform the test routine.

As another example, the step of determining whether the test routine is performable by the measurement instrument may comprise determining whether the measurement instrument supports the frequency ranges and/or frequency bandwidths necessary for performing the test routine.

As a further example, the step of determining whether the test routine is performable by the measurement instrument may comprise determining whether the measurement instrument supports signal power levels necessary for performing the test routine.

In another example, the step of determining whether the test routine is performable by the measurement instrument may comprise determining whether the measurement instrument supports a minimum sample rate necessary for performing the test routine.

In a further example, the step of determining the step of determining whether the test routine is performable by the measurement instrument may comprise determining whether the measurement instrument supports signal modulations that are necessary for performing the test routine.

Accordingly, the configuration data may comprise information on a number of measurement ports of the measurement instrument, a frequency range supported by the measurement instrument, a frequency bandwidth supported by the measurement instrument, signal power levels supported by the measurement instrument, a maximum sample rate supported by the measurement instrument, signal modulations supported by the measurement instrument, etc.

The configuration method according to embodiments of the present disclosure is based on the idea to automatically adapt the loaded test routine to the configuration of the measurement instrument based on the configuration data, such that the measurement instrument is enabled to perform the test routine on the device under test.

In some embodiments, the loaded test routine is adapted to the hardware configuration of the measurement instrument, e.g. to the number of measurement ports of the measurement instrument, to a frequency range supported by the measurement instrument, to a frequency bandwidth supported by the measurement instrument, to signal power levels supported by the measurement instrument, to a maximum sample rate supported by the measurement instrument, to signal modulations supported by the measurement instrument, etc.

Further, the loaded test routine may be adapted to a software configuration of the measurement instrument. For example, a visualization of measurement results associated with the test routine may be adapted.

Thus, the configuration method according to embodiments of the present disclosure allows to automatically transfer and adapt test routines to a measurement instrument, such that the expertise and time necessary for configuring the measurement instrument is reduced significantly.

According to an aspect of the present disclosure, the adapted test routine is performed, for example, by the measurement circuit. In some embodiments, measurement settings of the measurement instrument, for example measurement settings of the measurement circuit, are adapted based on the adapted test routine such that the measurement instrument is set for performing the adapted test routine.

In some embodiments, a performance of the device under test may be assessed by the measurement instrument by performing the adapted test routine on the device under test. In other words, a performance of the device under test may be assessed by the measurement instrument based on the adapted test routine.

In an embodiment of the present disclosure, the test routine has been generated on another or separate measurement instrument or on another or separate electronic device. Accordingly, the test routine may have been devised to be suitable for the (hardware) configuration of the other (separate) measurement instrument or of the other electronic device. Accordingly, the configuration method according to embodiments of the present disclosure provides the possibility to automatically adapt the test routine from one measurement instrument to the other. Thus, switching between different measurement instruments for performing tests on a particular device under test is facilitated significantly.

According to another aspect of the present disclosure, the test routine comprises, for example, footprint data. The footprint data may comprise, for example, information at least on a hardware configuration of the further measurement instrument or of the other (separate) electronic device.

Thus, in some embodiments, the step of determining whether the test routine is performable by the measurement instrument may be performed based on the footprint data, for example by comparing the footprint data with the configuration data. Alternatively or additionally, the step of adapting the loaded test routine may be performed based on the footprint data.

In a further embodiment of the present disclosure, the test routine has been generated on the other measurement instrument having a different hardware configuration than the measurement instrument. Accordingly, the configuration method according to embodiments of the present disclosure provides the possibility to automatically adapt the test routine from one measurement instrument to the other, wherein the measurement instruments may have different hardware configurations. Thus, switching between different measurement instruments having different hardware configurations for performing tests on a particular device under test is facilitated significantly.

Another aspect of the present disclosure provides that the test routine comprises, for example, a plurality of test sequences, and wherein the step of determining whether the test routine is performable by the measurement instrument comprises determining, by the control circuit, whether all test sequences of the test routine are performable by the measurement instrument.

According to a further aspect of the present disclosure, a notification, for example, is displayed on a display of the measurement instrument if it is determined that the measurement instrument is unable to perform the test routine at least partially. Accordingly, a user of the measurement instrument is notified if a desired test routine cannot be performed by the measurement instrument at least partially.

Therein, the term "at least partially" is understood to denote that one or more steps of the at least one test sequence, one or more test sequences or even all test sequences of the test routine cannot be performed by the measurement instrument.

In some embodiments, the displayed notification may comprise information on reasons why the test routine cannot be performed, for example missing hardware components, a too small number of measurement ports, frequency ranges and/or bandwidths not being supported, signal power levels not being supported, a maximum sampling rate of the measurement instrument being too low, signal modulation types not being supported, etc.

Alternatively or additionally, the displayed notification may comprise information on potential solutions, for example information on suitable types of measurement instruments for performing the test routine and/or information on necessary changes to the measurement setup in order to be able to perform the test routine.

If it is determined that the measurement instrument is unable to perform the test routine at least partially, the at least one test sequence is adapted by the control circuit such that a resulting at least one test sequence is performable by the measurement instrument. In other words, if the measurement instrument is unable to perform the originally intended test routine lease partially, individual steps of the test routine may be adapted such that the measurement instrument is enabled to perform the adapted test routine.

For example, individual steps of the at least one test sequence or even individual test sequences may be skipped or omitted if the measurement instrument is capable of performing the remaining test sequence(s).

As another example, frequency ranges, bandwidths, and/or signal power levels associated with the test routine may be adapted such that the resulting frequency ranges, bandwidths and/or signal power levels are supported by the measurement instrument and are within acceptable ranges for performing tests on the device under test.

In a further embodiment of the present disclosure, a notification is displayed on a display of the measurement instrument if the control circuit is unable to adapt the at least one test sequence such that the resulting at least one test sequence is performable by the measurement instrument. Accordingly, a user of the measurement instrument is notified if a desired test routine cannot be adapted to be performed by the measurement.

In some embodiments, the displayed notification may comprise information on reasons why the test routine cannot be adapted to be performed by the measurement instrument, for example missing hardware components, a too small number of measurement ports, frequency ranges and/or bandwidths not being supported, signal power levels not being supported, a maximum sampling rate of the measurement instrument being too low, signal modulation types not being supported, etc.

Alternatively or additionally, the display notification may comprise information on potential solutions, for example information on suitable types of measurement instruments for performing the test routine and/or information on necessary changes to the measurement setup in order to be able to perform the test routine.

According to an aspect of the present disclosure, the step of adapting the loaded test routine comprises, for example, receiving a user input, and adapting the test routine based on the received user input. For example, the user may decide to perform and/or skip certain steps of the test routine, for example certain test sequences. Alternatively or additionally, the user may adapt measurement parameters associated with the test routine, for example frequency ranges, bandwidths, signal power levels, signal modulations, sample rates, etc.

In some embodiments, the measurement instrument may comprise a suitable user interface being displayed on a display, for example on a display of the measurement instrument, that allows the user to interact with the measurement instrument, for example to adapt the loaded test routine.

An aspect of the present disclosure provides that the step of adapting the loaded test routine comprises, for example, an up-scaling of the test routine to a larger number of measurement ports. The term "up-scale" is understood to denote that the loaded test routine may be adapted such that a greater number of devices under test can be tested by the measurement instrument simultaneously. In other words, a test setup associated with the loaded test routine may be duplicated a certain number of times, such that a larger number of devices under test can be tested by the measurement instrument simultaneously.

For example, if the loaded test routine requires the measurement instrument to have two measurement ports for testing a two-port device under test, and if the measurement instrument has 16 measurement ports, the loaded test routine may be automatically adapted such that 8 identically constructed devices under test can be tested simultaneously by the measurement instrument.

Of course, these numbers have to be understood to be purely exemplary. The measurement instrument may have any other number of measurement ports, and any other number of measurement ports may be necessary in order to perform tests on the device under test.

In another embodiment of the present disclosure, the step of adapting the loaded test routine comprises a down-scaling of the test routine to a smaller number of measurement ports. The term "down-scale" is understood to denote that the loaded test routine may be adapted such that a smaller number of devices under test can be tested by the measurement instrument simultaneously.

For example, if the loaded test routine requires the measurement instrument to have twelve measurement ports for testing three four-port devices under test simultaneously, and if the measurement instrument has eight measurement ports, the loaded test routine may be automatically adapted such that two identically constructed four-port devices under test can be tested simultaneously by the measurement instrument.

Another aspect of the present disclosure provides, for example, that the configuration data also comprises diagnosis data, wherein the diagnosis data comprises information on a condition of components of the measurement instrument, and wherein the loaded test routine is adapted based on the diagnosis data. Accordingly, the loaded test routine may be automatically adapted to the condition of the measurement instrument or to the condition of individual components of the measurement instrument.

For example, the information on the condition of the components may comprise information on whether the respective components are operating correctly or not. Components that are not operating correctly may be deactivated. In a particular example, a measurement port having a malfunction may be deactivated.

In some embodiments, the diagnosis data may be self-diagnosis data. In other words, the measurement instrument, for example the control circuit, may be configured to determine the diagnosis data by performing a self-diagnosis of the measurement instrument.

In some embodiments, the test routine may be down-scaled to a smaller number of measurement ports based on the diagnosis data. For example, if it is detected that one or more measurement ports are not operating correctly, these measurement ports may be disabled and the test routine may be down-scaled to the remaining measurement ports.

According to another aspect of the present disclosure, the loaded test routine comprises requirement data, wherein the requirement data comprises information on technical requirements that the test routine poses on measurement instruments. For example, the requirement data may comprise information on a necessary number of measurement boards, a necessary supported frequency range, a necessary supported bandwidth, necessary supported signal power levels, a necessary minimum sample rate, necessary supported signal modulations, etc.

In some embodiments, the step of determining whether the test routine is performable by the measurement instrument is performed based on the requirement data. In some embodiments, the configuration data may be compared with the requirement data in order to determine whether the test routine is performable by the means of the measurement instrument.

In a further embodiment of the present disclosure, a calibration scheme is determined by the control circuit based on the adapted test routine. Therein, the calibration scheme may correspond to a calibration routine that is to be performed in order to calibrate the measurement instrument for performing the test routine.

In some embodiments, the calibration scheme may be displayed on a display of the measurement instrument in order to assist a user in calibrating the measurement instrument. For example, the individual steps necessary for calibrating the measurement instrument may be displayed or illustrated on the display, such that a step-by-step instruction for calibrating the measurement instrument is provided to the user.

Alternatively or additionally, the measurement instrument is calibrated by the control circuit based on the determined calibration scheme. In other words, the calibration of the measurement instrument may be performed at least partially automatic by the control circuit. Thus, the expertise and time necessary for performing the test on the device under test are reduced even further.

Embodiments of the present disclosure further provide a measurement instrument. In an embodiment, the measurement instrument comprises at least one measurement port being connectable to at least one device under test. The measurement instrument further comprises a control circuit and a measurement circuit, wherein the control circuit is connected to the measurement circuit, and wherein the measurement circuit is connected to the at least one measurement port. The control circuit is configured to load a test routine comprising at least one test sequence to be performed by the measurement circuit. The control circuit further is configured to determine whether the test routine is performable by the measurement instrument based on the comparison of the test routine with the configuration data. The control circuit further is configured to adapt the loaded test routine based on the configuration data, thereby obtaining an adapted test routine to be performed by the measurement circuit.

In some embodiments, the measurement instrument is configured to perform the configuration method according to any of the variants described above.

Regarding the further advantages and properties of the measurement instrument, reference is made to the explanations given above with respect to the configuration method, which also hold for the measurement instrument and vice versa.

According to an aspect of the present disclosure, the measurement instrument comprises, for example, a plurality of measurement ports being connectable to the same device under test or to different devices under test. For example, the measurement instrument may comprise two, four, eight, 16, or 24 measurement ports. However, it is also conceivable that the measurement instrument may comprise any other number of measurement ports, for example an odd number of measurement ports or more than 24 measurement ports.

In some embodiments, the measurement instrument may be a vector network analyzer, an oscilloscope, or a measurement receiver. In certain embodiments, the measurement instrument may be a digital oscilloscope or a radio frequency (RF) receiver with an RF frontend.

However, it is to be understood that the measurement instrument may be established as any other suitable type of measurement instrument.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
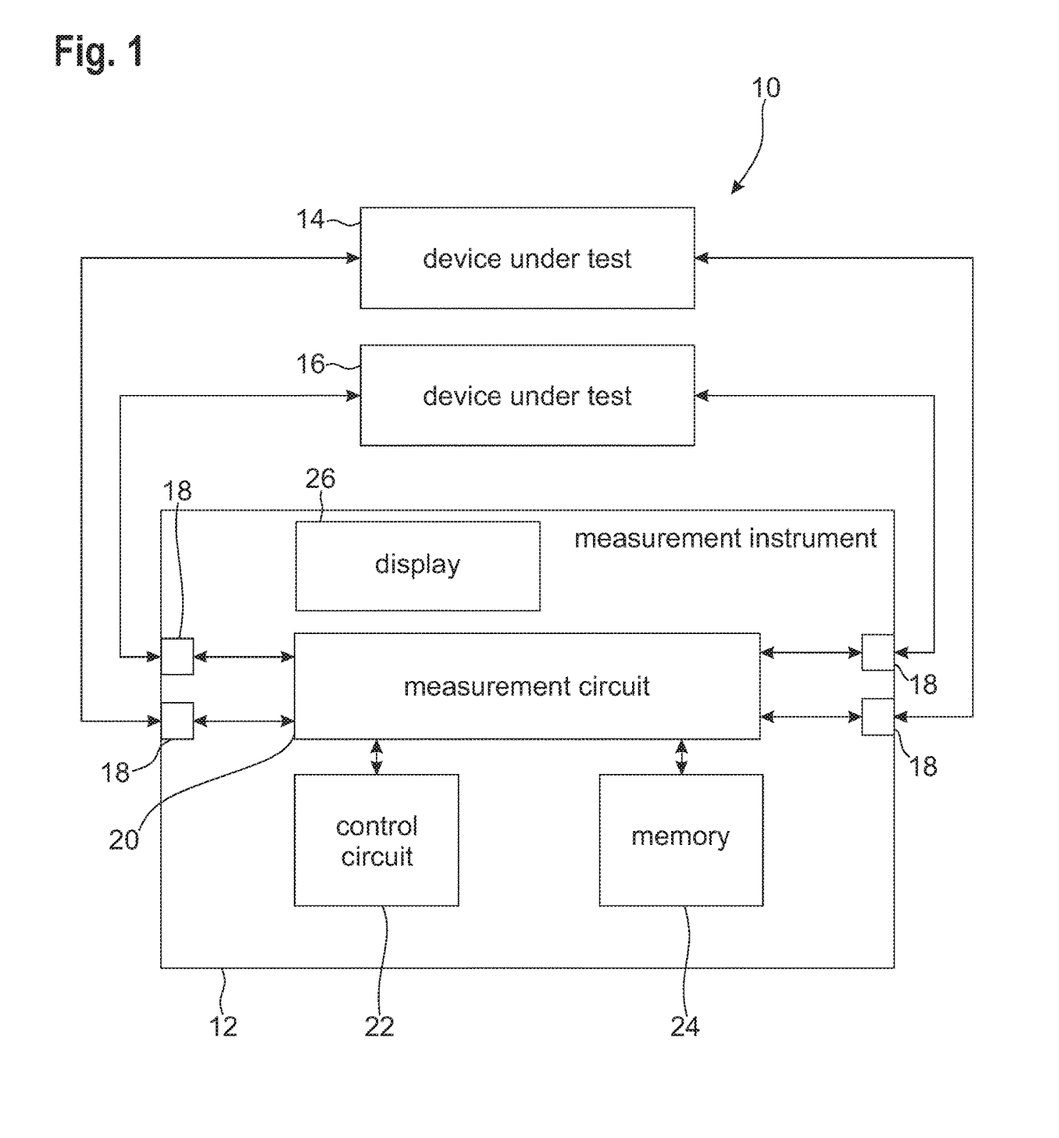
FIG. 1 schematically shows a measurement system with a measurement instrument according to an embodiment of the present disclosure.

FIG. 1 schematically shows an example of a measurement system 10 comprising a measurement instrument 12, a first device under test 14, and a second device under test 16. In general, the measurement instrument 12 is configured to perform tests on the devices under test 14, 16 by applying a signal to the devices under test 14, 16, and/or analyzing output signals of the devices under test 14, 16.

The devices under test 14, 16 may be established as an arbitrary type of electronic device to be tested, respectively. In the particular example shown in FIG. 1, the devices under test 14, 16 are established as a two-port device, respectively. For example, the devices under test 14. 16 may be established as an amplifier, a mixer, a filter, a frontend, or any other type of two-port electronic device.

However, it is to be understood that the embodiment shown in FIG. 1 is only exemplary. In some embodiments, the measurement system 10 may comprise an arbitrary number of devices under test having an arbitrary number of ports, respectively.

While it is conceivable that the devices under test 14, 16 are different types of devices under test, it is assumed without restriction of generality in the following that the devices under test 14, 16 are functionally identical to each other.

The measurement instrument 12 may be established as any suitable type of measurement instrument for performing tests on the devices under test 14, 16. For example, the measurement instrument 12 may be a vector network analyzer, an oscilloscope, or a measurement receiver. In some embodiments, the measurement instrument 12 may be a digital oscilloscope or a radio frequency (RF) receiver with an RF frontend.

In the embodiment shown, the measurement instrument 12 comprises a plurality of measurement ports 18 that are connected to the devices under test 14, 16. For example, each measurement port 18 is connected to one port of one of the devices under test 14, 16 by a cable-based connection, i.e. via a suitable cable.

The measurement instrument 12 further comprises a measurement circuit 20 that is connected to each of the measurement ports 18. In general, the measurement circuit 20 is configured to perform measurements on the devices under test 14, 16 by applying certain signals to the devices under test 14, 16 via the measurement ports 18 and/or by analyzing output signals received from the devices under test 14, 16 via the measurement ports 18. Accordingly, the measurement circuit 20 may comprise various circuitry, such as a signal generator, a signal analysis circuit, and/or other types of electronic circuitry being configured to perform the tests on the devices under test 14, 16.

The embodiment shown in the measurement instrument 12 further comprises a control circuit 22 being connected to the measurement circuit 20. The measurement instrument 12 may further comprise a memory 24 being connected to the control circuit 22 and, optionally, to the measurement circuit 20.

In some embodiments, a display 26 is provided that is configured to display measurement data obtained by the measurement circuit 20 and/or a user interface via which a user can interact with the measurement instrument 12. It is noted that while the display 26 is shown to be integrated into the measurement instrument 12, it is also conceivable that the measurement instrument 12 may be connected to an external display, for example via an external computing device.

Figure 2:
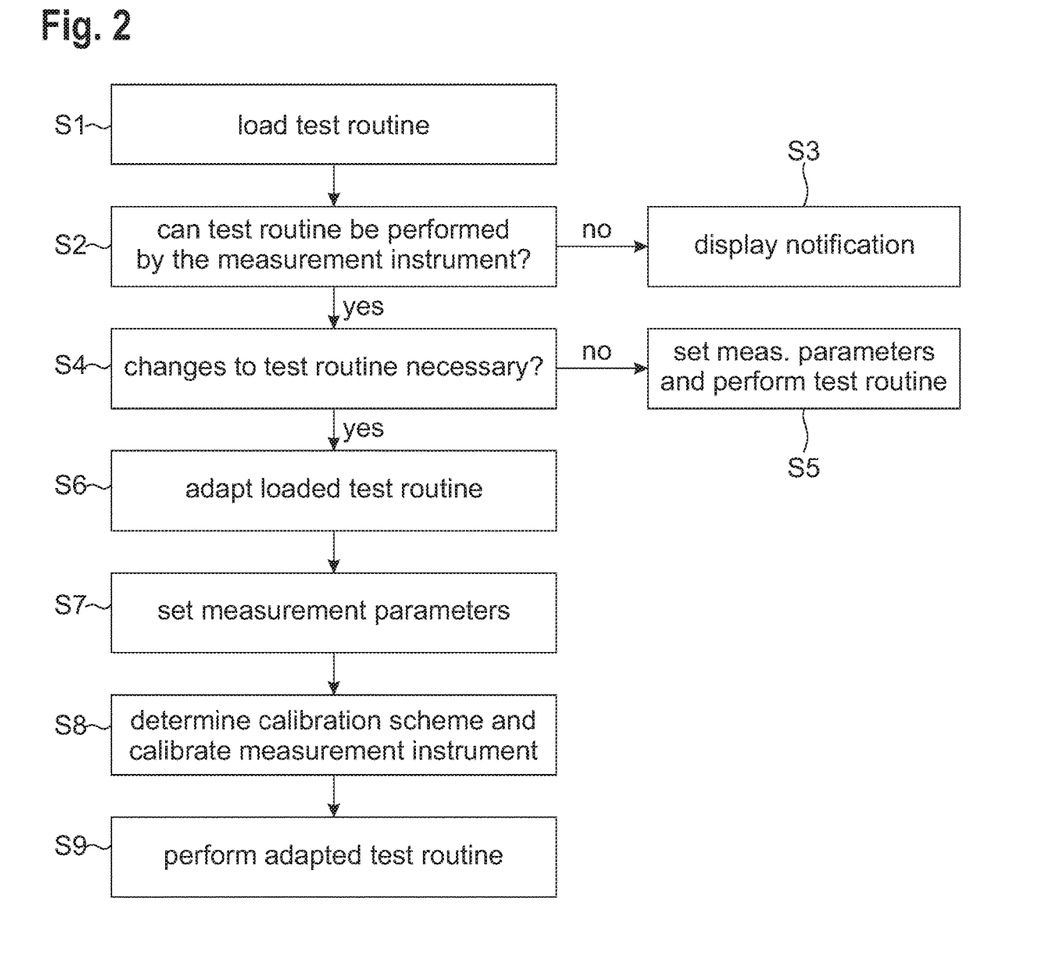
FIG. 2 shows a representative flow chart of a configuration method according to an embodiment of the present disclosure.

The measurement system 10 or the measurement instrument 12 is configured to perform a configuration method of configuring the measurement instrument 12, an example of which is described in the following with reference to FIG. 2.

A test routine is loaded by the control circuit 22, wherein the test routine comprises at least one test sequence to be performed by the measurement instrument 12 or by the measurement circuit 20 (step S1).

Therein, the test routine may be loaded from the memory 24 or may be received from another measurement instrument tor another electronic device.

Thus, in general the loaded corresponds to test sequences to be performed by another measurement instrument, wherein that measurement instrument may have a different hardware configuration than the measurement instrument 12.

Therein and in the following, the term "hardware configuration" is understood to denote, for example, a number of measurement ports, a supported frequency range, a supported frequency bandwidth, supported signal power levels, a maximum sample rate, supported signal modulations, and/or any other suitable parameter.

In some embodiments, the loaded test routine may comprise footprint data, wherein the footprint data comprises information on the hardware configuration of the measurement instrument for which the test routine has been devised. Alternatively or additionally, the loaded test routine may comprise requirement data, wherein the requirement data comprised information on technical requirements that the test routine poses on measurement instruments.

For example, the requirement data may comprise information on a necessary number of measurement boards, a necessary supported frequency range, a necessary supported bandwidth, necessary supported signal power levels, a necessary minimum sample rate, necessary supported signal modulations, etc.

The loaded test routine is compared with configuration data by the control circuit 22, wherein the configuration data comprises information on a hardware configuration of the measurement instrument 12 (step S2).

For example, as a first step, the control circuit 22 may determine whether the measurement instrument 12 is generally able to perform the test routine at least partially, i.e. whether the hardware configuration of the measurement instrument fulfills the minimum hardware requirements posed by the test routine.

The step of determining whether the test routine is performable by the measurement instrument 12 may be performed based on the footprint data and/or based on the requirement data comprised in the loaded test routine, for example by comparing the footprint data and/or the requirement data with the configuration data.

Optionally, the configuration data may comprise diagnosis data, wherein the diagnosis data comprises information on a condition of components of the measurement instrument 12.

In some embodiments, the information on the condition of the components may comprise information on whether the respective components of the measurement instrument 12 are operating correctly or not, wherein components that are not operating correctly may be deactivated.

In some embodiments, the diagnosis data may be self-diagnosis data. In other words, the measurement instrument 12, for example the control circuit 22, may be configured to determine the diagnosis data by performing a self-diagnosis of the measurement instrument 12.

If in step S2 it is determined that the measurement instrument 12 does not meet the minimum hardware requirements of the test routine, a notification is generated and displayed on the display 26 (step S3).

The displayed notification may comprise information on reasons why the test routine cannot be performed by the measurement instrument 12. In some embodiments, the displayed notification may comprise information on hardware configuration requirements that are not met by the measurement instrument 12.

Alternatively or additionally, the displayed notification may comprise information on potential solutions, for example information on suitable types of measurement instruments for performing the test routine and/or information on necessary changes to the measurement setup in order to be able to perform the test routine.

If in step S2 it is determined that the measurement instrument 12 meets the minimum requirements of the test routine, it is determined whether any changes to the loaded test routine are necessary in order to enable the measurement instrument 12 to perform the loaded test routine (step S4).

If in step S4 it is determined that no changes to the loaded test routine are required, the control circuit 22 may set measurement parameters of the measurement instrument 12 according to the loaded test routine, and the loaded test routine may be performed (step S5).

If in step S4 it is determined that changes to the loaded test routine are necessary, the loaded test routine is adapted by the control circuit 22 based on the configuration data, thereby obtaining an adapted test routine to be performed by the measurement instrument 12 or by the measurement circuit 20 (step S6).

For example, the loaded test routine is adapted to the hardware configuration of the measurement instrument 12, e.g. to the number of measurement ports of the measurement instrument 12, to a frequency range supported by the measurement instrument 12, to a frequency bandwidth supported by the measurement instrument 12, to signal power levels supported by the measurement instrument 12, to a maximum sample rate supported by the measurement instrument 12, to signal modulations supported by the measurement instrument 12, etc.

However, it is also conceivable that the loaded test routine may be adapted to a software configuration of the measurement instrument 12. For example, a visualization of measurement results associated with the test routine may be adapted.

In some embodiments, the loaded test routine may be adapted based on the footprint data comprised in the loaded test routine, based on the requirement data comprised in the loaded test routine, and/or based on the configuration data.

Adapting the loaded test routine may comprise an up-scaling of the test routine to a larger number of measurement ports. The term "up-scale" is understood to denote that the loaded test routine may be adapted such that a greater number of devices under test can be tested by the measurement instrument 12 simultaneously. In other words, a test setup associated with the loaded test routine may be duplicated a certain number of times, such that a larger number of devices under test can be tested by the measurement instrument 12 simultaneously.

In the representative embodiment shown in FIG. 1, the loaded test routine may require the measurement instrument 12 to have two measurement ports 18 in order to test a single device under test 14.

As the measurement instrument 12 has four measurement ports 18, the test routine is automatically up-scaled such that the two devices under test 14, 16 can be tested simultaneously.

Alternatively, adapting the loaded test routine may comprise a down-scaling of the test routine to a smaller number of measurement ports.

In the representative embodiment shown in FIG. 1, the loaded test routine may require the measurement instrument 12 to have twelve measurement ports 18 in order to test six devices under test simultaneously. As the measurement instrument 12 only has four measurement ports 18, the test routine is automatically down-scaled such that the two devices under test 14, 16 can be tested simultaneously.

In a particular example, the test routine may be down-scaled to a smaller number of measurement ports based on the diagnosis data or based on the condition information comprised in the diagnosis data. For example, if it is detected that one or more of the measurement ports 18 are not operating correctly, these measurement ports 18 may be disabled and the test routine may be down-scaled to the remaining measurement ports 18.

Measurement settings of the measurement instrument, for example measurement settings of the measurement circuit 20, are adapted based on the adapted test routine such that the measurement instrument 12 is set for performing the adapted test routine (step S7).

If necessary, a calibration scheme may be determined by the control circuit 22 based on the adapted test routine (step S8).

In general, the calibration scheme may correspond to a calibration routine that is to be performed in order to calibrate the measurement instrument 12, for example the measurement circuit 20 in conjunction with the measurement ports 18, for performing the test routine. In some embodiments, the calibration scheme may be displayed on the display 26 in order to assist a user in calibrating the measurement instrument 12.

For example, the individual steps necessary for calibrating the measurement instrument 12 may be displayed or illustrated on the display 26, such that a step-by-step instruction for calibrating the measurement instrument 12 is provided to the user. Alternatively or additionally, the measurement instrument 12 may be calibrated automatically by the control circuit 22 based on the determined calibration scheme. Therein, the calibration scheme may be optimized to be performed in a minimal amount of time.

For example, in the representative embodiment shown in FIG. 1 not all possible combinations of measurement ports 18 (so-called "through-connections") have to be calibrated with respect to each other. In some embodiments, through-connections only have to be established between the measurement ports 18 being connected to the same one of the devices under test 14, 16.

If all four measurement ports 18 were connected to a single four-port device under test, all possible combinations of the four measurement ports 18 have to be calibrated, i.e. through-connections have to be established between each possible pair of measurement ports 18.

The adapted test routine is performed by the measurement circuit 20 (step S9).

In some embodiments, a performance of the devices under test 14, 16 may be assessed by the measurement instrument 12 by performing the adapted test routine on the devices under test 14, 16.

It is noted that all of the steps described above may be performed at least partially automatic, for example fully automatic. However, a user may choose to perform individual steps manually and/or to adapt individual steps by interacting with the measurement instrument 12 via the user interface displayed on the display 26.

Certain embodiments disclosed herein include components, such as the measurement instrument 12, that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry one or more processors or portions thereof and accompanying software, firmware, hardware, and the like. In some embodiments, the functionality described herein can be implemented by special purpose hardware-based computer systems or circuits, etc., or combinations of special purpose hardware and computer instructions.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), a graphical processing unit (GPU), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, the one or more computer-readable media contains computer readable instructions embodied thereon that, when executed by the one or more computer circuits, sometimes referred to as computing devices, cause the one or more computer circuits to perform one or more steps of any of the methods described above or claimed herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A configuration method of configuring a measurement instrument, the measurement instrument comprising at least one measurement port being connectable to at least one device under test, the measurement instrument further comprising a control circuit and a measurement circuit, the control circuit being connected to the measurement circuit, and the measurement circuit being connected to the at least one measurement port, the configuration method comprising:
    loading, by the control circuit, a test routine comprising at least one test sequence to be performed by the measurement circuit;
    comparing, by the control circuit, the test routine with configuration data stored in the control circuit, wherein the configuration data comprises information at least on a hardware configuration of the measurement instrument;
    wherein the loaded test routine comprises requirement data, wherein the requirement data comprised information on technical requirements that the test routine poses on the measurement instrument;
    determining, by the control circuit, whether the test routine is performable by the measurement instrument based on the comparison of the test routine with the configuration data and based on the requirement data, wherein at least hardware requirements of the test routine to be performed are compared against the hardware configuration of the measurement instrument to determine whether the measurement instrument meets the hardware requirements of the test routine to be performed; and adapting, by the control circuit, the loaded test routine at least to the hardware configuration of the measurement instrument based on the configuration data, thereby obtaining an adapted test routine to be performed by the measurement circuit.

2. The configuration method of claim 1, wherein the adapted test routine is performed by the measurement circuit.

3. The configuration method of claim 1, wherein the test routine has been generated on a further measurement instrument or on a further electronic device.

4. The configuration method of claim 3, wherein the test routine comprises footprint data, wherein the footprint data comprises information at least on a hardware configuration of the further measurement instrument or of the further electronic device.

5. The configuration method of claim 1, wherein the test routine has been generated on a further measurement instrument having a different hardware configuration than the measurement instrument.

6. The configuration method of claim 1, wherein the test routine comprises a plurality of test sequences, and wherein the step of determining whether the test routine is performable by the measurement instrument comprises determining, by the control circuit, whether all test sequences of the test routine are performable by the measurement instrument.

7. The configuration method of claim 1, wherein a notification is displayed on a display of the measurement instrument if it is determined that the measurement instrument is unable to perform the test routine at least partially.

8. The configuration method of claim 1, if it is determined that the measurement instrument is unable to perform the test routine at least partially, the at least one test sequence is adapted by the control circuit such that a resulting at least one test sequence is performable by the measurement instrument.

9. The configuration method of claim 1, wherein a notification is displayed on a display of the measurement instrument if the control circuit is unable to adapt the at least one test sequence such that a resulting at least one test sequence is performable by the measurement instrument.

10. The configuration method of claim 1, wherein said adapting the loaded test routine comprises receiving a user input, and adapting the test routine based on the received user input.

11. The configuration method of claim 1, wherein said adapting the loaded test routine comprises an up-scaling of the test routine to a larger number of measurement ports than indicated in the loaded test routine.

12. The configuration method of claim 1, wherein said adapting the loaded test routine comprises a down-scaling of the test routine to a smaller number of measurement ports than indicated in the loaded test routine.

13. The configuration method of claim 1, wherein the configuration data also comprises diagnosis data, wherein the diagnosis data comprises information on a condition of components of the measurement instrument, and wherein the loaded test routine is adapted based on the diagnosis data.

14. The configuration method of claim 1, wherein a calibration scheme is determined by the control circuit based on the adapted test routine.

15. The configuration method of claim 14, wherein the calibration scheme is displayed on a display of the measurement instrument in order to assist a user in calibrating the measurement instrument.

16. The configuration method of claim 14, wherein the measurement instrument is calibrated by the control circuit based on the determined calibration scheme.

17. A measurement instrument, the measurement instrument comprising at least one measurement port being connectable to at least one device under test, the measurement instrument further comprising a control circuit and a measurement circuit, the control circuit being connected to the measurement circuit, and the measurement circuit being connected to the at least one measurement port, wherein the control circuit is configured to load a test routine comprising at least one test sequence to be performed by the measurement circuit, wherein the loaded test routine comprises requirement data, wherein the requirement data comprised information on technical requirements that the test routine poses on the measurement instrument;

wherein the control circuit further is configured to determine whether the test routine is performable by the measurement instrument based on the comparison of the test routine with the configuration data and based on the requirement data, wherein the control circuit is configured to compare at least hardware requirements of the test routine to be performed against the hardware configuration of the measurement instrument to determine whether the measurement instrument meets the hardware requirements of the test routine to be performed, and wherein the control circuit further is configured to adapt the loaded test routine at least to the hardware configuration of the measurement instrument based on the configuration data, thereby obtaining an adapted test routine to be performed by the measurement circuit.

18. The measurement instrument of claim 17, wherein the measurement instrument comprises a plurality of measurement ports being connectable to the same device under test or to different devices under test.

19. The measurement instrument of claim 17, wherein the measurement instrument is a vector network analyzer, an oscilloscope, or a measurement receiver.

* * * * *